Jan. 25, 1944.　　　　E. E. BIDWELL　　　2,339,759
HOSE CLAMP
Filed Sept. 9, 1942　　　3 Sheets-Sheet 1
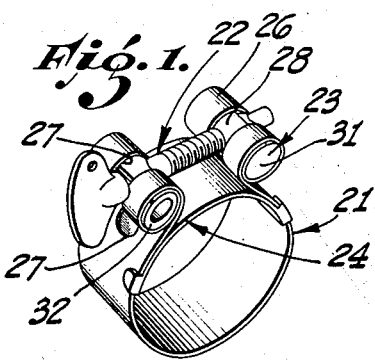
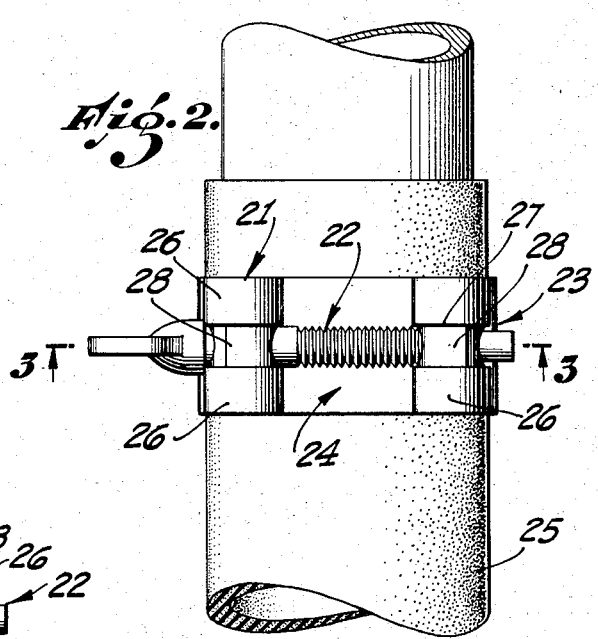
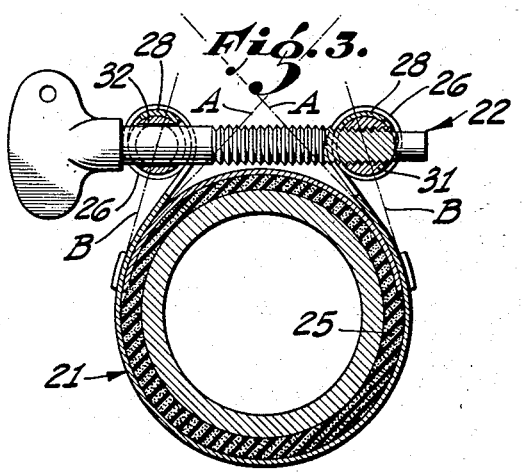
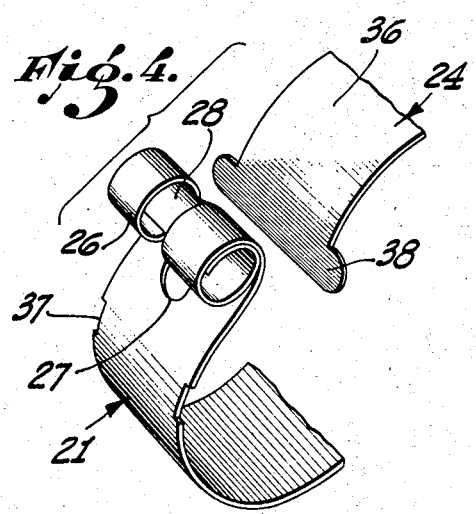
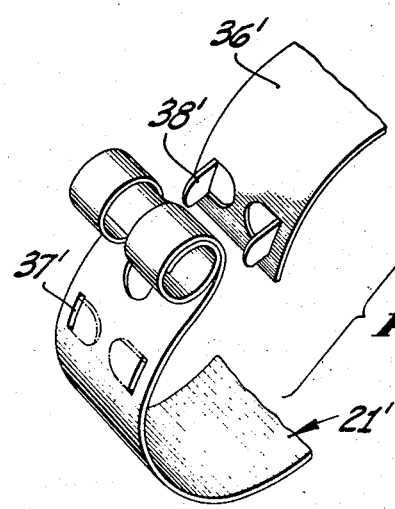
EARL E. BIDWELL,
INVENTOR.
BY
ATTORNEY.

Jan. 25, 1944. E. E. BIDWELL 2,339,759
HOSE CLAMP
Filed Sept. 9, 1942 3 Sheets-Sheet 2

EARL E. BIDWELL,
INVENTOR.

BY
ATTORNEY.

Jan. 25, 1944.  E. E. BIDWELL  2,339,759
HOSE CLAMP
Filed Sept. 9, 1942  3 Sheets-Sheet 3

EARL E. BIDWELL,
INVENTOR.

BY Stuart M. Mauer
ATTORNEY.

Patented Jan. 25, 1944

2,339,759

UNITED STATES PATENT OFFICE 2,339,759

HOSE CLAMP

Earl E. Bidwell, Los Angeles, Calif., assignor to Walter P. Innes, Jr., Wichita, Kans.

Application September 9, 1942, Serial No. 457,777

9 Claims. (Cl. 24—19)

This invention relates to strap tighteners, and more particularly to improvements in hose clamps.

An object of my present invention is to provide a novel connection between the flexible hose-encircling strap and the draw bolt the function of which is to draw the ends of the strap together and thereby tighten the strap into clamping relation upon the hose.

Another object is to provide an improved bolt and strap connection of the character indicated which increases the length of that portion of the clamp throughout which it applies its pressures radially inwards against the hose, and thereby increases the efficiency of the clamp inasmuch as it makes it more nearly "full fitting."

A more detailed object in this connection is to provide a clamp connection as described wherein a yoke is employed to distribute the tension generated by the draw bolt evenly throughout the greater width of the strap, and wherein the strap leads off the yoke tangentially, and on that side thereof which is closer to the hose, with the result that the portion of the strap which is under tension is wrapped around the hose and presses radially inwardly thereagainst to points on the circumference thereof which are spaced apart a shorter distance than in the case of hose clamps of more conventional construction wherein the direction in which the strap leads off the yoke is radial.

A further object is to provide a hose clamp strap and draw bolt interconnection of the character indicated which is self-tightening in that it is so constructed that as the tension of the strap increases the interconnection automatically becomes firmer, thus assuring against relative slipping of the joint more positively as the working tension of the strap increases.

A still further object in this connection is the provision of a self-tightening strap and draw bolt interconnection as indicated wherein the parts are so constructed and co-operatively associated that they fasten themselves together without the aid of any riveting, welding, or any other expedient commonly employed to fasten such parts together.

Yet another object of the present invention is the provision of a host clamp of the character described which is of ample strength, durability, and dependability to meet the specifications established for such devices for use upon aircraft, and yet is capable of being produced rapidly in large numbers and at a cost low enough to enable it to compete successfully even with clamps of much less efficient and satisfactory design.

The invention possesses other objects and valuable features, some of which, with those enumerated, will be set forth in the following description of the preferred embodiments of my invention illustrated in the drawings accompanying and forming part of the specification. It is to be understood that I do not limit myself to the showing made by the said drawings and description as I may adopt variations of the preferred embodiments within the scope of my invention as defined in my claims.

Referring to the drawings:

Figure 1 is a perspective view of a hose clamp embodying the principles of the present invention.

Figure 2 is an enlarged view in top plan showing the host clamp operatively installed on a hose.

Figure 3 is a transverse, vertical sectional view taken upon the line 3—3 of Figure 2 with the direction of view as indicated.

Figure 4 is a perspective, detail view of a part of the clamp, illustrating one manner of connecting the tongue to the band.

Figure 5 is a view similar to Figure 4 but illustrating an alternative method of connecting the tongue to the band.

Figure 6:
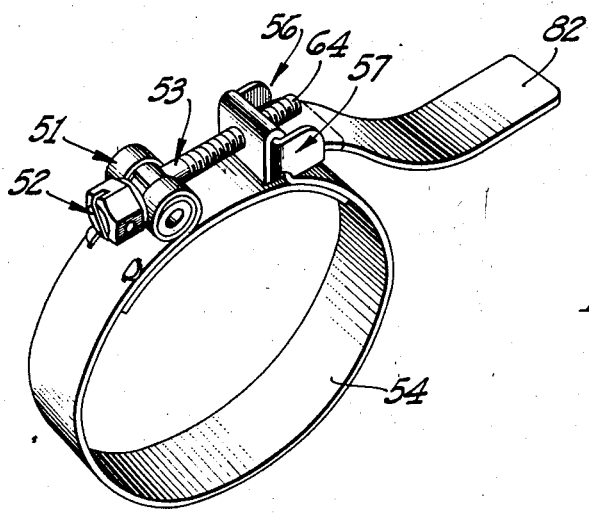
Figure 6 is a view similar to Figure 1 but illustrating a modified form of hose clamp incorporating the principles of the invention.
Figure 9:
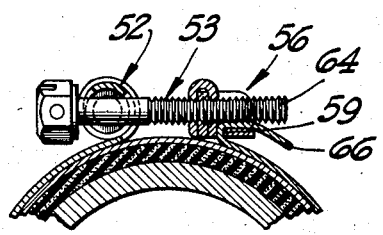
Figure 9 is fragmentary view similar to Figuse 8 but showing the draw bolt tightened to draw the ends of the tension straps more closely together, and thereby impose working tension upon the strap.
Figure 8:
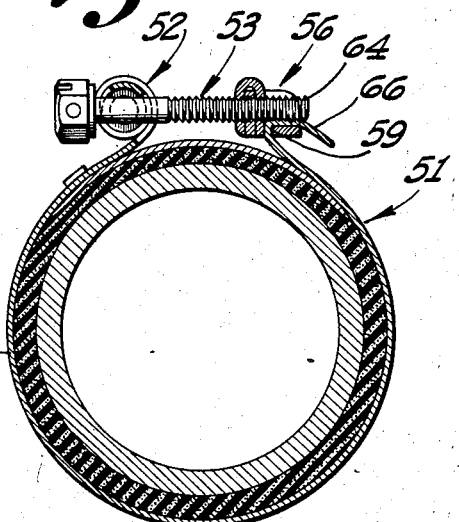
Figure 8 is a transverse, vertical sectional view taken upon the line 8—8 of Figure 7 with the direction of view as indicated.
Figure 7:
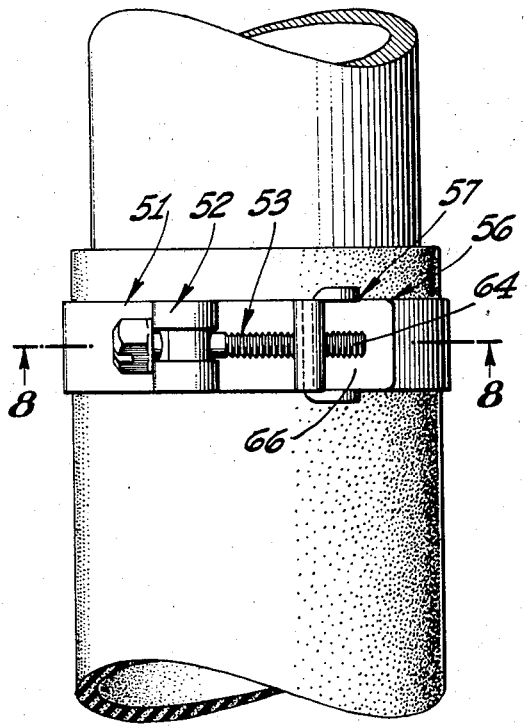
Figure 7 is a top plan view of the hose clamp of Figure 6 showing the clamp operatively installed on a hose.
Figure 10:
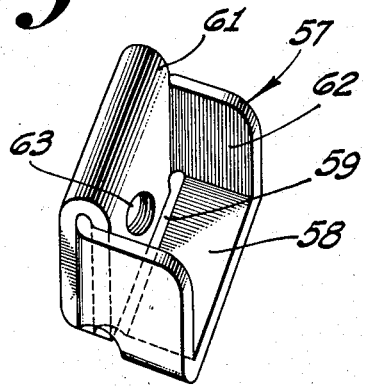
Figure 10 is an enlarged perspective view of the yoke employed for interconnecting the draw bolt and one end of the tension strap.
Figure 11:
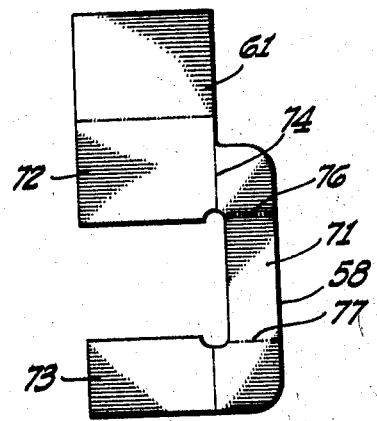
Figure 11 is a plan view of the blank of metal cut to shape and size but not yet bent to its ultimate form, which is used in the construction of the stress-distributing yoke of Figure 10.
Figure 12:
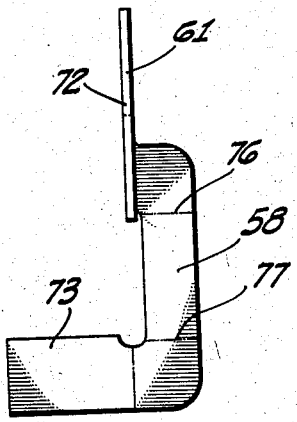
Figure 16:
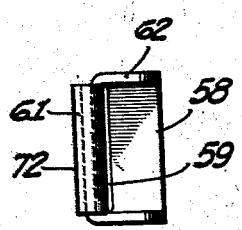

Figures 12 to 16, inclusive, illustrate the blank of Figure 11 in the successive forms to which it is bent as the folding and bending operation is carried out, the completed yoke being illustrated in Figure 16.

Figure 13:
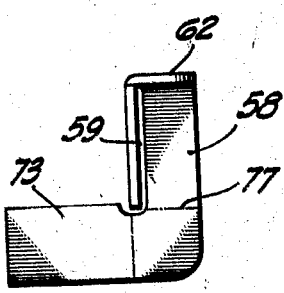
Figure 14:
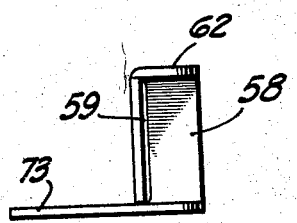
Figure 15:
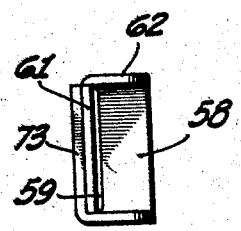
Figure 17:
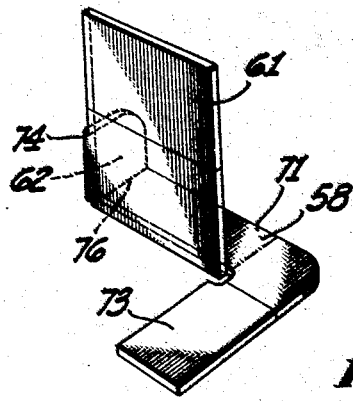

Figure 17 is a perspective view of the partially formed yoke at that stage in the production thereof which is illustrated in Figure 13.

Referring first to that modification of my invention which is illustrated in Figures 1 to 3 inclusive, my improved and simplified hose clamp comprises a hose-encircling tension strap 21 the ends of which are adapted to be drawn towards each other by a drawbolt 22, and a yoke construction 23 for connecting each end of the strap 21 with the drawbolt 22. A tongue also is employed to fill the gap between the spaced ends of the strap 21 and thereby prevent buckling of the hose 25 outwards between the ends of the strap when the clamp is tightened. The strap 21 and tongue 24 preferably are formed of metal, and I have found that for most types of installation rustless, flexible sheet steel is most suitable.

One of the features of my invention lies in the manner in which each end of the strap 21 is operably connected to the drawbolt 22. For this purpose, each end of the strap is wound in spiral form, and each of the spiral portions 26 thus produced is preferably of more than one full turn, approximately one and one-half full turns having been found preferable. Moreover a longitudinally extending slot 27 is formed adjacent each end of the strap 21, this slot preferably being long enough to extend throughout the spiral portion 26 of the strap except at the extreme end thereof which is disposed inside the spiral, where the slot 27 is closed by a transversely extending portion 28, the function of which will be explained in detail hereinbelow.

One of the stress-distributing yokes 23 is associated with each of the spiral ends 26 for the purpose of transmitting the tension which is generated by the drawbolt 22 to the tension strap 21 and distributing that tension evenly through the entire width of the strap which, of course, is considerably greater than that of the drawbolt 22. Each of these yokes 23 is of cylindrical form and may optionally be solid, as indicated at 31, or of hollow construction, as illustrated at 32. In some instances the hollow form 32 may be preferable because of the saving of material and consequent reduction in weight associated with such construction. However, in the case of the yoke 31 illustrated on the right hand side of Figure 1, it is preferred that the solid form be employed inasmuch as the drawbolt 22 is threadedly engaged therewith, and if a solid type of yoke be employed a greater length of threads will be provided. The same importance does not attach to the form 32 of yoke inasmuch as the drawbolt 22 passes freely therethrough through a clearance hole permitting free rotation of the drawbolt with respect to the yoke.

In distinction from more conventional construction, the yokes 23 are not mechanically fastened to the associated ends of the strap 21; instead they are merely loosely disposed within the respective spirals 27. Accordingly, each of yokes 23 is free floating; i. e., is to rotate within the associated spiral, with the result that each yoke serves in the capacity of a trunnion inasmuch as it is capable of turning with respect to that portion of the strap which embraces it. An advantage of the free floating nature of the trunnions is that it permits them to accommodate themselves to the new alignment of the two opposed trunnions resulting from the decreased circumference of the strap as the ends thereof are drawn more closely together. However, in spite of the fact that each of the trunnions is not positively fastened to the associated end of the strap, the spiral nature of that portion of the strap which engages the trunnion provides positive assurance against displacement of the strap from its engagement with the trunnion. The extreme end of the strap is compressed between the trunnion and a portion of the strap upon which full tension is imposed with the result that a snubbing action is developed which positively connects the strap and the trunnion in such a manner as to provide positive assurance against their becoming disconnected. In fact the security of this connection increases proportionately with the degree of tension which is imposed upon the strap 21. However, as an added precaution, the transverse portion 28 of the strap which closes the outer end of the slot 27 positively prevents unwinding of the spiral portion 26 because it engages the drawbolt 22 which extends transversely through both the trunnion or yoke 23 and through the spiral portion 26 of the strap which is wound therearound.

This type of interconnection between the tension strap and the yoke is of importance not only because it results in lowered cost of manufacture by eliminating the necessity of riveting, welding, or other mechanical means of interconnection, but it also adds very materially to the overall efficiency of the hose clamp by decreasing the distance between the spaced ends of the clamp when in operative position upon the hose. As is best understood by reference to Figures 3 the tension of the strap 21 is imparted to each of the yokes 23 in a tangential manner, i. e., at one side of the yoke and on that side of the yoke which is closer to the hose 25, along the lines indicated at A in Figure 3. This is in distinct contrast to the corresponding action in hose clamps of more conventional construction wherein it is customary for the tension of the strap to be applied in a line leading directly to the longitudinal axis of the yoke, as along lines indicated at B in Figure 3. It will readily be appreciated, therefore, that for a given size of hose and for a given spacing between the axes of the two yokes 23 the strap 21 will be wound further around the circumference of the hose and pressed radially inwards thereagainst when the connection between the strap and the yokes is in accordance with the hereinabove description where the tension is applied tangentially. This, of course, diminishes the distance between the points at which the pressure of the strap against the hose terminates and makes the hose clamp of the present invention more nearly full fitting than is possible in any other type of hose clamp construction of which I am aware.

Another advantage arising out of the spiral arrangement of the ends of the strap around the trunnions is that any tendency for the strap to unwind from around the trunnion, such as that developing when tension is imparted to the strap by the trunnion itself, is accompanied by a tendency for the trunnion to rotate about its own axis. In the case of the trunnion 31, through which the draw bolt 22 is threaded, this tendency toward rotary motion of the trunnion enhances the security of the engagement between the trunnion and the threads of the draw bolt, by pressing the threads of each more deeply into the valleys between threads of the other, this action developing adjacent both ends of the threaded hole through which the draw bolt extends. Obviously, this minimizes any tendency toward stripping of the threads which results from imposing more tension upon the draw bolt than the diameter and thread design thereof justify.

Even with this improved type of interconnection between the strap and yoke it is impossible to so construct the hose clamp that the tension strap 21 presses radially inwards against the hose throughout the entire circumference of the hose, and therefore it is customary to employ a tongue 36 fastened to one end of the strap 21 and extending circumferentially across the space between that end and the other end so as to prevent buckling of the hose outward between the ends of the strap when the clamp is tightened. Whereas one end of the tongue 36 is fastened to the associated end of the strap 21 it is preferred that the other end of the tongue be slidably disposed under the other end of the strap and compressed between it and the hose so as to permit both the tongue and the strap to conform themselves to the new positions thereof as the clamp is tightened. Figures 4 and 5 illustrate alternative methods of fastening the tongue to the strap without necessitating the use of riveting, welding or the like. In Figure 4 notches 37 are formed in the opposite edges of the strap 21 to receive flanges 38 which extend laterally outwards from the edges of the tongue 36 when the tongue is first formed and which are adapted to be bent outwards to seat within the notch of 37 and crimped tightly around the edges of the strap 21 so as to fasten the tongue 36 firmly in operative position to the strap 21. The construction illustrated in Figure 5 is similar except that flanges 38' are struck outward by being severed from the body of the tongue 36' instead of extending laterally out from the side edges thereof when the tongue is first formed. Since this places the flanges 38' more closely together than in the case of the tongue 36 in Figure 4, openings 37' are formed in the body of the strap 21' to accommodate them in place of the notches 37 of the previously described modification.

Referring now to the modification illustrated in Figures 6 to 17, inclusive, this modification of my hose clamp possesses the added advantage that the point on the tension strap to which one of the stress distributing yokes is attached is not determined until the clamp is in position to be tightened upon the hose. The advantage of this detail of construction is that a single size of hose clamp is adaptable for use in conjunction with a plurality of sizes of hose, thereby reducing the number of stock sizes of clamps necessary to service all sizes of hose.

In this modification the stress distributing yoke 51 associated with the head end 52 of the drawbolt 53 may be of any suitable design, preferably however being connected to the tension strap 54 by the spiral snubber type connection described hereinabove in conjunction with the previously described modification. The stress distributing yoke 56 associated with the other end of the strap, however, is of considerably different form, being in the nature of a saddle 57 the construction of which can best be understood by referring to Figures 10 and 11 to 17 inclusive. This saddle 57 comprises a shelf portion 58 adapted to be positioned substantially tangentially with respect to the circumferential portion of the tension strap 54 (see Figure 8) and having a transverse slot 59 through which the strap 54 extends slidably so as to permit the saddle 57 to be placed upon that portion of the strap 54 which is appropriate to the size of hose to be clamped. At one side of the shelf portion 28 an upstanding flange 61 is provided, the angularity between the flange 61 and the shelf 58 being rigidly maintained by end brackets 62. A hole 63 is formed through the flange 61 and is threaded to receive the drawbolt 53 and the parts are so proportioned and arranged that the extreme lowest portion of the threaded hole 63 is spaced above the plane of the upper surface of the shelf 58 a distance closely similar to the thickness of the strap 54 so that when the strap 54 after passing upwards through the slot 59 is bent sharply down against the upper surface of the shelf 58 and the bolt 53 threaded through the hole 63, the projecting end 64 of the bolt 53 will press the loose end 66 of the strap 54 down against the shelf 58 so firmly that slipping of the strap upon the shelf 58 is precluded. It will be observed, however, that the edge 57 of the shelf 58 which defines one side of the slot 59 is relatively sharp, with the result that the extended end of 64 of the bolt 53 bends the strap 54 quite sharply therearound, thus adding to the security of the interconnection between the strap 54 and the saddle 57 and assuring that the tension generated by the drawbolt 53 will be distributed to the strap 54 throughout the entire width of the latter.

It is preferred that the upstanding flange 61 through which the drawbolt 53 is threaded shall be of multiple thickness so as to increase the length of the threaded portion of the bolt which is engaged by the flange and thereby increase the strength of this portion of the device. Figures 11 to 17 inclusive, illustrate a novel and highly efficient manner of constructing the saddle 57 to meet these requirements. In accordance with this method of production the blank which is first cut from a flat sheet of metal is illustrated in Figure 11.

The part which is ultimately to form the shelf portion is in the form of a flat strip 71 interconnecting two laterally extending flanges 72 and 73 which are connected to the end of the strip 71 at the ends of the flanges 72 and 73. After the blank is thus formed the first step of bending to produce the saddle 57 is to bend the wider flange 72 upwards along the line of bending 74 so that the flange 72 then extends perpendicularly with respect to the plane of the remainder of the blank. The next step is to bend this flange 72 upwards again about a line 76 which is perpendicular to the first line of bending 74 and which extends transversely across the strip 71 adjacent one end thereof. This second bending operation brings the flange 72 downward so that its lower edge is closely adjacent the plane of the strip 71 or shelf 58 of the ultimate saddle and is spaced laterally from a side edge thereof so as to define the slot 59 in the ultimate saddle. This last described bending operation brings the blank to the form illustrated in Figures 13 and 17. The next operation is to bend the material along a line of bending 77 similar to the line 76 but in the other end of the shelf-forming portion 71, thus placing the narrower flange 73 in position perpendicular to the plane of the shelf 71 and extending past the plane of the first bent flange 72. The next step is to bend the projecting portion of the flange 73 around the back of the upstanding flange 72 to the position illustrated in Figure 15; and the next and last step is to bend the upper portion of the flange 72 downward around the top edge of the flange 73 so that it is then disposed in embracing relation to the narrower flange 73. In this manner the upstanding flange 61 is formed of triple thickness and is connected to the horizontal shelf portion 58 by a strengthening bracket 62 at each end which imparts great rigidity and strength to the completed saddle.

It is intended that hose clamps constructed in accordance with this last described modification be provided with a tension strap 54 of extended length, i. e., length greater than that necessary to fit the clamp to the largest size of hose to be accommodated. Then when it is desired to install a clamp upon any size of hose (within suitable limits) a clamp should be assembled thereon with the strap 54 fitting the hose loosely, and before the drawbolt 53 is tightened the extending end 82 of the strap be pulled so as to slide the strap 54 through the slot 59 of the saddle until that portion of the strap 54 which encircles the hose is drawn hand-tight upon the hose. Then the drawbolt 53 should be tightened, the effect of which will be to fasten the strap securely to the saddle after which the saddle and the other yoke will be drawn toward each other so strongly as to impose the desired degree of tension upon the strap.

I claim:

1. A hose clamp comprising a flexible strap having a longitudinal slot adjacent each end, a trunnion associated with each end of said strap, each of said trunnions having the associated slotted portion of said strap wound therearound to dispose the associated end of the strap between the associated slotted portion and that trunnion, and means interconnecting said trunnions and extending through said slots for pulling said trunnions toward each other.

2. A hose clamp comprising a flexible strap having a longitudinal slot adjacent each end, a trunnion associated with each end of said strap, each of said trunnions having the associated slotted portion of said strap wound therearound to dispose the associated end of the strap between the associated slotted portion and that trunnion, a bolt extending through both of said slots and transversely through both of said trunnions, and means for tightening said bolt to draw said trunnions toward each other.

3. A hose clamp comprising a flexible strap having a longitudinal slot adjacent each end, a trunnion associated with each end of said strap, each of said trunnions having the associated slotted portion of said strap wound therearound to dispose the associated end of the strap between the associated slotted portion and that trunnion, and means interconnecting said trunnion and extending through said slots for pulling said trunnions toward each other, said slots being spaced from the ends of said strap whereby the distal ends of the slots are closed by transverse portions of the strap adapted to engage said interconnecting means if and when said strap starts to unwind from said trunnions.

4. A hose clamp comprising a flexible strap having a longitudinal slot adjacent each end, a trunnion associated with each end of said strap, each of said trunnions having the associated slotted portion of said strap wound therearound to dispose the associated end of the strap between the associated slotted portion and that trunnion, a bolt extending through both of said slots and transversely through both of said trunnions, and means for tightening said bolt to draw said trunnions toward each other, said slots being spaced from the ends of said strap whereby the distal ends of the slots are closed by transverse portions of the strap adapted to engage said bolt if and when said strap starts to unwind from said trunnions.

5. In a hose clamp, a stress-distributing yoke comprising a shelf portion having a transverse slot therein adapted to receive a hose clamp strap, flanges upstanding at the ends of said shelf, the ends of said flanges at one side of said shelf being bent inwards into overlapping relation to each other to form a multiple thickness transverse flange and having a threaded hole therethrough in predetermined spaced relation with the plane of the upper surface of said shelf portion.

6. In a hose clamp, a stress-distributing yoke comprising a shelf portion having a transverse slot therein adapted to receive a hose clamp strap, flanges upstanding at the ends of said shelf, the ends of said flanges at one side of said shelf being bent inwards into overlapping relation extending transversely of said shelf portion above the plane of the upper surface thereof and one of said flanges having an extension bent around an edge of the other flange into embracing relation therewith to form a triple thickness transverse flange, and means for receiving a clamping screw in position to clamp a strap extending upwards through said slot against said upper surface of said shelf portion.

7. In a hose clamp, a stress-distributing yoke comprising a shelf portion having a transverse slot therein adapted to receive a hose clamp strap, flanges upstanding at the ends of said shelf, the ends of said flanges at one side of said shelf being bent inwards into overlapping relation extending transversely of said shelf portion above the plane of the upper surface thereof and one of said flanges having an extension bent around an edge of the other flange into embracing relation therewith to form a triple thickness transverse flange, said transverse flange having a threaded hole therethrough parallel to said upper surface of said shelf portion with the crests of its threads spaced above the plane thereof a distance substantially corresponding to the thickness of said strap whereby a bolt threaded through said hole and extending over said shelf presses said strap against said shelf.

8. In a hose clamp, a stress distributing yoke comprising a shelf portion, flanges upstanding at the ends of said shelf, corresponding ends of said flanges being extended and disposed in overlapping relation to each other to form a multiple thickness flange extending transversely of said yoke, said transverse flange being parallel to and spaced from an edge of said shelf portion to define a slot for the slidable reception of a hose clamp strap, and means for receiving a clamping screw in position to clamp said strap against the upper surface of said shelf.

9. In a hose clamp, a stress-distributing yoke comprising a shelf portion, flanges upstanding at the ends of said shelf, corresponding ends of said flanges being extended and disposed in overlapping relation to each other to form a multiple thickness flange extending transversely of said yoke, said transverse flange being parallel to and spaced from an edge of said shelf portion to define a slot for the slidable reception of a hose clamp strap, said transverse flange having a threaded hole therethrough parallel to said upper surface of said shelf portion with the crests of its threads spaced above the plane thereof a distance substantially corresponding to the thickness of said strap whereby a bolt threaded through said hole and extending over said shelf presses said strap against said shelf.

EARL E. BIDWELL.